United States Patent [19]

Fukahori et al.

[11] 4,435,061

[45] Mar. 6, 1984

[54] ELECTRIC MOTOR DRIVE DEVICE FOR CAMERA

[75] Inventors: Hidehiko Fukahori, Kanagawa; Toshikazu Ichiyanagi; Tomonori Iwashita, both of Tokyo; Yukio Mashimo, Kanagawa; Akio Sunouchi; Masahisa Fujino, both of Tokyo, all of Japan

[73] Assignee: Canon Kabushiki Kaisha, Tokyo, Japan

[21] Appl. No.: 384,339

[22] Filed: Jun. 2, 1982

[30] Foreign Application Priority Data

Jun. 11, 1981 [JP] Japan ............................. 56-90031

[51] Int. Cl.³ .............................................. G03B 1/18
[52] U.S. Cl. ................................ 354/173.11; 354/213; 354/214
[58] Field of Search ............... 354/171, 173, 204–206, 354/214, 213; 352/124

[56] References Cited

U.S. PATENT DOCUMENTS

| | | | |
|---|---|---|---|
| 3,809,464 | 5/1974 | Bennett | 354/214 X |
| 4,294,530 | 10/1981 | Iwashita et al. | 354/214 X |
| 4,306,794 | 12/1981 | Fukahuri et al. | 354/173 |
| 4,340,289 | 7/1982 | Maida | 354/173 |
| 4,371,244 | 2/1983 | Daitoku et al. | 354/173 |
| 4,373,795 | 2/1983 | Kimura et al. | 354/173 |

*Primary Examiner*—William B. Perkey
*Attorney, Agent, or Firm*—Toren, McGeady and Stanger

[57] ABSTRACT

An electric motor drive device for a camera is arranged such that, in cases where power supply to a film winding motor is stopped with the camera still in an incomplete winding state and when the film comes to the end thereof after completion of a photographic operation on every frame, the power supply to the motor is resumed in response to a film rewinding completion signal produced from a film detection switch upon completion of film rewinding so that the camera can be brought into a winding completion state. This arrangement solves the problem of phase discrepancy arising between the camera body and the electric motor drive device when they are separated from each other.

8 Claims, 5 Drawing Figures

ELECTRIC MOTOR DRIVE DEVICE FOR CAMERA

BACKGROUND OF THE INVENTION

1. Field of the Invention

This invention relates to an electric motor drive device for a camera automatically set in a winding completed state in response to detection of film rewinding completion when the film used comes to an end while still incompletely wound within the camera.

2. Description of the Prior Art

After completely photographing all film frames, further winding brings the film to an end leaving the film in a state of being pulled by a motor. To prevent the film from breaking and the motor from overheating, in the conventional camera electric drive devices, the power supply to the motor is stopped and a light emitting diode is turned on to indicate the end of the film. In some of the conventional electric motor drive devices, the power supply to the motor is stopped part way through the winding process by a switch interlocked with a film counter and then the end of the film is displayed.

To rewind the film, a sprocket is released by opening a power source switch (or a counter is released where a counter is provided) for rewinding. In this instance, with the power source cut off, the power supply to the motor is stopped and a circuit for displaying the end of the film is reset to erase the display of the end of the film. After completion of film rewinding, when the power source switch is again turned on, the power supply to the motor is resumed to set the camera into a winding completed state from its uncompleted winding state. In this instance, the winding completed state is attained for a predetermined length of time after commencement of the power supply to the motor. Therefore, the film end display is not lighted.

In another method, when a film end display is made with the power supply to the motor stopped, film rewinding is carried out with the film end display left on; then, after completion of rewinding, the camera is set into a winding completed state by means of a camera winding lever; and the power supply to the motor is stopped and a circuit for the film end display is reset to permit the next photographic operation.

Each of the conventional methods has thus necessitated the step of setting the camera into a winding completed state either by turning the power supply on and off or by operating a winding lever. It has been impossible to perform the next photographic operation without carrying out these processes. Furthermore, in cases where the mechanical phase of the camera body and the mechanical phase within the electric motor drive device are interrelated, if the camera body and the motor drive device are separated from each other in an uncompleted winding state and then are coupled with another camera body or electric drive device which is at a different phase, this out-of-phase combination hinders normal functions from being performed until the different phases coincide with each other.

Electric motor drive cameras provided with electric motor winding and rewinding facilities include a type in which, after completion of photography for a predetermined number of frames, a winding process is performed. The winding process is performed in association with the switch of a film counter and is stopped halfway. Then, in carrying out the motor rewinding operation, the camera is set into a winding completed state in association with the release of the counter and a sprocket. However, this arrangement is nothing more than setting the camera into a winding completed state. Since this setting is effected before commencement of the electric motor rewinding operation, if a shutter release is effected during the process of the rewinding operation, the shutter would expose the film being rewound to light.

It is an object of the present invention to provide an electric motor drive device for a camera which is capable of obviating the above-stated shortcomings of the prior art by automatically setting the camera into a winding completed state upon completion of film rewinding to solve the discrepancy in phase arising between the camera body and the electric motor drive device when they are separated from each other.

It is another object of the invention to provide an electric motor drive device for a camera in which a film detection signal terminal disposed between the camera body and the electric motor drive device is also usable for other signals.

SUMMARY OF THE INVENTION

In one form of the invention, these and other objects of the invention are attained in an electric motor driven camera which includes driving means for winding and control means arranged to stop the driving means upon completion of winding and to allow the driving means to perform a driving action upon completion of an exposure action. The apparatus also includes stopping means arranged to bring the driving action to a stop when the film comes to an end thereof and detection means for detecting completion of film rewinding. The detection means is arranged to generate a detection signal when completion of film rewinding is detected. The apparatus also includes release means which releases the stopping means from the stopping action thereof in response to the detection signal from the detection means. The release means is arranged to operate the driving means upon completion of winding by releasing the stopping means from the stopping action thereof.

These and further objects and features of the invention will become apparent from the following detailed description of a preferred embodiment thereof taken in connection with the accompanying drawings.

DESCRIPTION OF PREFERRED EMBODIMENT

Figure 1:
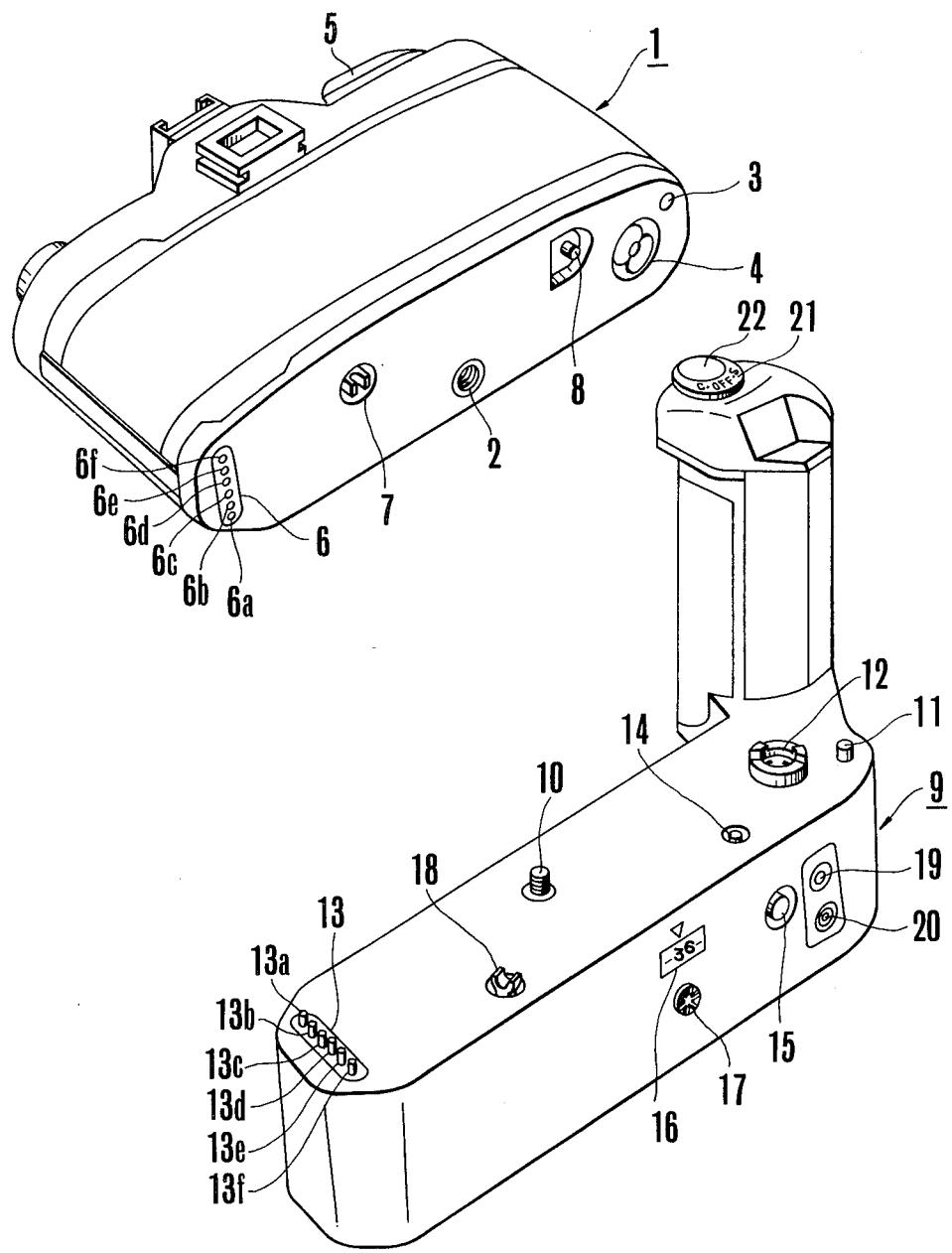
FIG. 1 is an oblique view of a camera body and an electric motor drive device in accordance with an embodiment of the invention.

In the embodiment of FIG. 1 which shows a camera body and an electric motor drive device, there is provided a camera body 1; a tripod screw hole 2; a positioning hole 3 for positioning the electric motor drive device; a winding coupler 4 disposed on the camera side; a winding lever 5; a signal terminal 6 disposed on the camera side consisting of six terminals 6a-6f; an AE coupler 7 for stopping down a lens; a sprocket release button 8; an electric motor drive device body 9; a mounting screw 10 which is tightly screwed into the above-stated tripod screw hole 2; a positioning pin 11 which is fitted into the above-stated positioning hole 3 in mounting the motor drive device on the camera body; a winding coupler 12 engaged with the winding coupler 4 of the camera body side for winding a film for charging a shutter and for charging a mirror; a signal terminal 13 disposed on the motor drive device side and electrically connected to the signal terminal 6 disposed on the camera side; a sprocket release interlocking shaft 14; a rewinding button 15 to push the above-stated sprocket release button 8 upward through the shaft 14; a counter 16; a counter setting dial 17; an AE coupler 18 for driving the lens stop from the electric motor drive device and which engages the AE coupler 7 disposed on the camera side when the motor drive device is mounted on the camera body; a light emitting diode (LED) 19; a remote control jack 20; a mode selector dial 21 having positions S, OFF and C; and a release button 22 which turns on a switch SW1 by the first stroke of a depressing operation thereon and turns on another switch SW2 by the second stroke of the depressing operation. The switches SW1 and SW2 will be described later herein.

Figure 2:
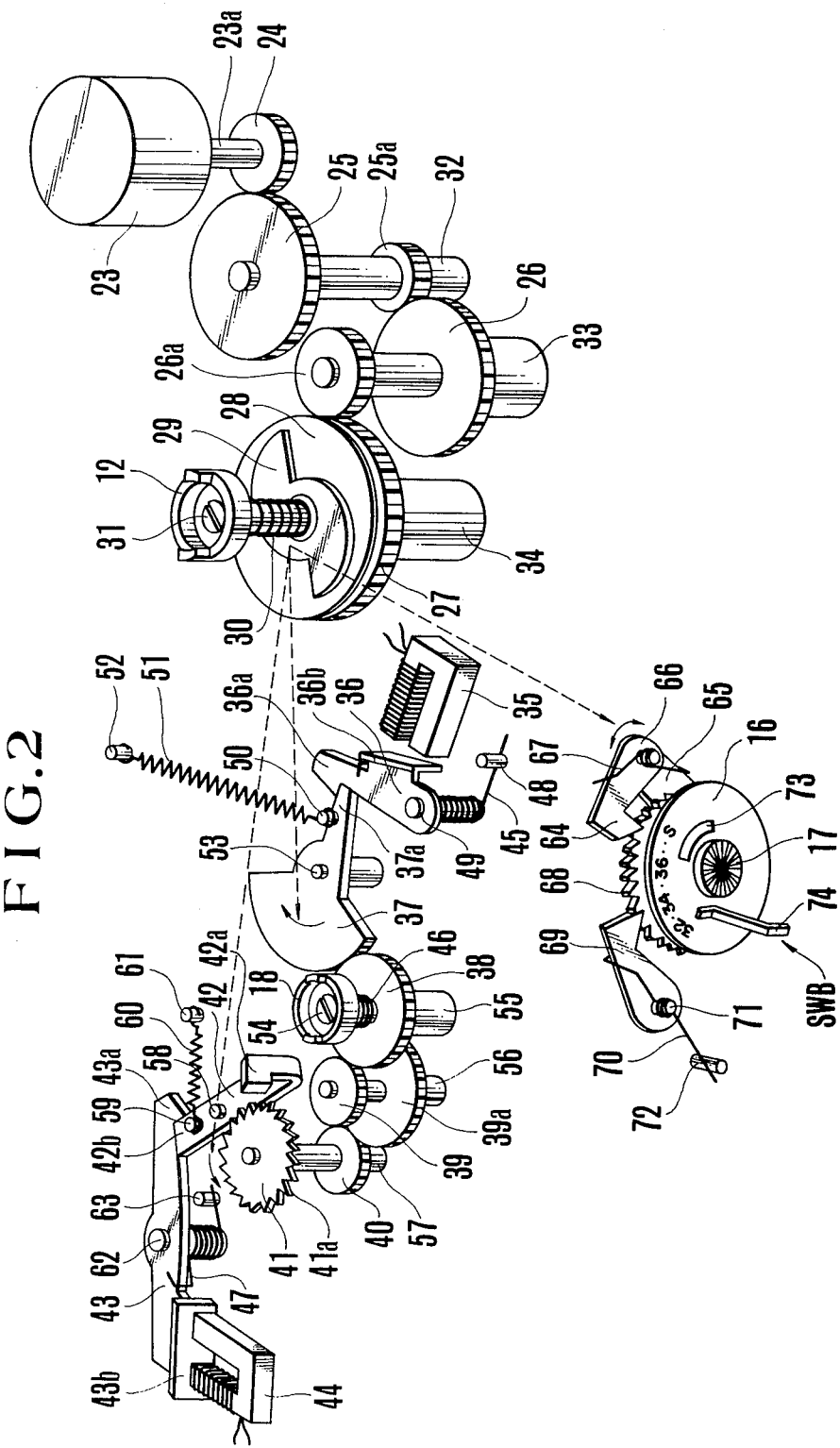
FIG. 2 is an illustration showing the arrangement of the internal mechanism of the electric motor drive device shown in FIG. 1.

The internal mechanism of the electric motor drive device of FIG. 1 is arranged as shown in FIG. 2. The internal mechanism includes a motor 23 which is provided with a motor shaft 23a; a gear 24 which is secured to the motor shaft 23a; and another gear 25 which engages the gear 24. The gear 25 is one unified body with a gear 25a, which is rotatably supported by a shaft 32. The gear 25a engages a gear 26. The gear 26 is one unified body with a gear 26a which is rotatably supported by a shaft 33. The gear 26a engages a winding gear 27 which is provided with a guide disc 28. A reference numeral 29 designates a winding cam. The winding cam 29 performs an AE charging and counter driving action by turning 180 degrees. The above-stated winding coupler 12 is provided with an absorption spring 30 which urges the winding coupler upward. The winding coupler 12 is movable downward against the force of the spring 30. A screw 31 prevents the winding coupler 12 from pulling out. The gear 27, guide disc 28, winding cam 29 and winding coupler 12 are coaxially and rotatably supported by a shaft 34 and rotate together. The device further includes an AE starting magnet 35; a start lever 36 which is provided with a clamping part 36a; and an armature 36b which is made of a magnetic material such as electromagnetic soft iron. The armature 36b is secured to the start lever 36 and is attracted by the magnet 35 against the force of a spring 45 when the magnet 35 is operated. The spring 45, which is attached to a fixed pin 48 at one end thereof, urges the start lever 36 counterclockwise while the lever 36 is rotatably supported by a shaft 49. A sector gear 37 is provided with a clamping part 37a which engages the above-stated clamping part 36a. The sector gear 37 is rotatably supported by a shaft 53 and is also provided with a spring attaching pin or a spring peg 50. A spring 51, which has one end thereof attached to the pin 50 and the other end to a fixing pin 52, urges the sector gear 37 to turn counterclockwise. The sector gear 37 engages a gear 38 which is rotatably supported by a shaft 55. The above-stated AE coupler 18 is urged upwards by a spring 46 and is movable downward against the force of the spring 46. The coupler 8 rotates together with the gear 38. The coupler 18 is prevented from pulling out by a screw 54. The gear 38 engages a gear 39 which is integrally formed with another gear 39a and is rotatably supported by a shaft 56. The gear 39a engages a gear 40. This gear 40 rotates together with a stop wheel 41 which is provided with a claw part 41a formed along the outer circumferential part thereof. The gear 40 and the stop wheel 41 are coaxially and rotatably supported by a shaft 57. There is provided a stop pawl 42 which has a claw part 42a and a clamping part 42b. The claw part 42a and the clamping part 42b are in an uprising portion of the stop pawl 42. A spring 60 has one end thereof attached to an upstanding spring peg or pin 59 on the stop pawl 42 and the other end thereof attached to a fixed pin 61 which urges the stop pawl 42 to turn clockwise while the stop pawl is rotatably and pivotally supported by a shaft 58. The clamping part 42b engages a clamping part 43a of a stop lever 43. The stop lever 43 is rotatably and pivotally supported by a shaft 62. Meanwhile, a spring 47, which has one end thereof attached to a fixed pin 63, urges the stop lever 43 to turn clockwise. Another armature 43b is also made of a magnetic material in the same manner as the armature 36b and is secured to the stop lever 43. An AE stopping magnet identified by the reference numeral 44, attracts the armature 43b when operated. A counter 16 is coaxial with a setting dial 17 and a ratchet wheel 68. The ratchet wheel 68 engages the fore end of a feed pawl 64. A driving lever 65 has one end thereof rotatable coaxially with the counter 16 while a pin 66 is secured to the other end thereof. The feed pawl 64 is rotatably supported by the pin 66. A spring 67, which has one end thereof attached to the driving lever 65, urges the feed pawl 64 counterclockwise and thus causes the feed pawl 64 to be constantly abutting on the ratchet wheel. A stop pawl 69 is rotatably supported by a fixed shaft 71 at one end thereof while the other end thereof continuously abuts the ratchet wheel 68 due to the bias of a spring 70 which has one end thereof attached to a fixed pin 72. A reference symbol SWB designates a switch which is interlocked with the counter 16 for automatically stopping a winding operation. The winding automatic stopping switch SWB consists of a conductive pattern 73 and a contact piece 74.

Figure 3:
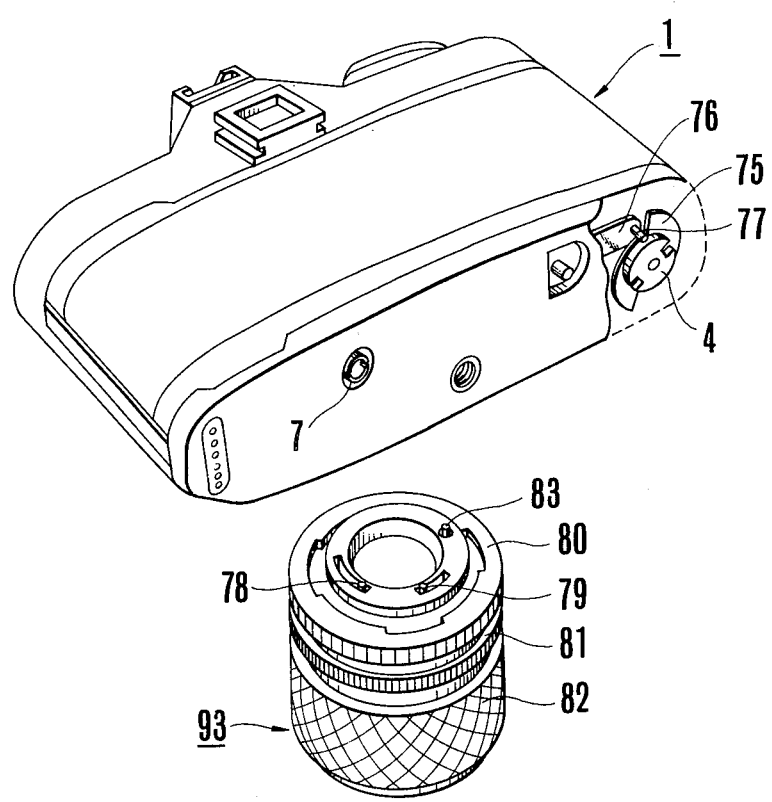
FIG. 3 is a perspective view of a winding interlocking mechanism disposed on the motor drive device confronting side of the camera body and lens.

Referring now to FIG. 3, there is shown the camera of FIG. 1 with a part of the lower side cut away. A camera charge cam 75 is integral and coaxial with the winding coupler 4. There is provided a charge lever 76 which has a charge pin 77 erected thereon. With the charge lever 76 arranged in this manner, the shutter charging, mirror charging and film winding actions of the camera are performed by a 180° rotation of the charge cam 75. The winding coupler 4, disposed on the camera side, and the winding coupler 12 are in such a phased relation to each other that they engage each other in a camera charge completion position and in a mirror drive device charge completion position respectively. A lens 93 is provided with a clamping ring 80, which is used for mounting the lens on the camera body. The lens 93 is further provided with an aperture signal lever 78 which determines the diaphragm aperture position and is urged counterclockwise by a spring (not shown). The signal lever 78 engages an interlocking member (not shown) disposed within the camera body. A stopping-down lever 79 is urged clockwise by a spring (not shown) and stops the aperture down to the aperture position determined by the above-stated lever 78. On the lens, there is provided a stop ring 81. In carrying out a manual photographic operation, the aperture is determined by using this stop ring 81. When the stop ring 81 is set in the automatic photographic position A, a pin 83 protrudes into the inside of the camera body to shift a switch SWC which is disposed within the camera body and will be described hereinafter. A distance ring is identified by the reference numeral 82.

Figure 4:
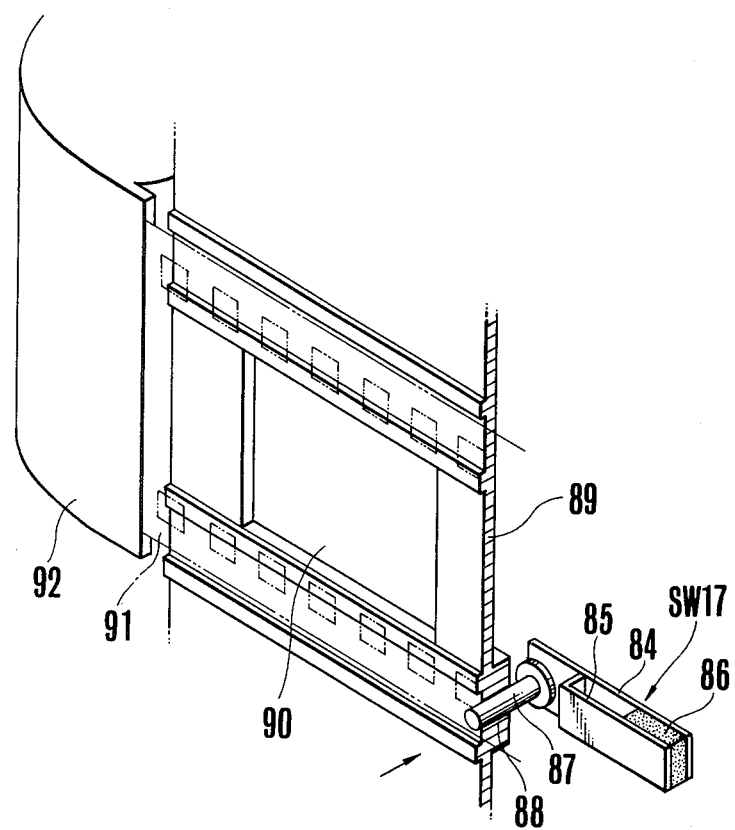
FIG. 4 is a detailed perspective view of a film detecting switch disposed within the camera body shown in FIG. 1.

FIG. 4 shows the film detection switch arrangement within the camera body as shown in FIG. 1. Referring now to FIG. 4, a rewinding completion switch SW17 consists of a contact piece 84, another contact piece 85 and an insulating material 86. A film sensing pin 87 is fitted into a hole 88 provided between an outer rail and inner rail of a die casting part of the camera body. A numeral 90 designates an aperture; and 91 a film cartridge.

Figure 5:
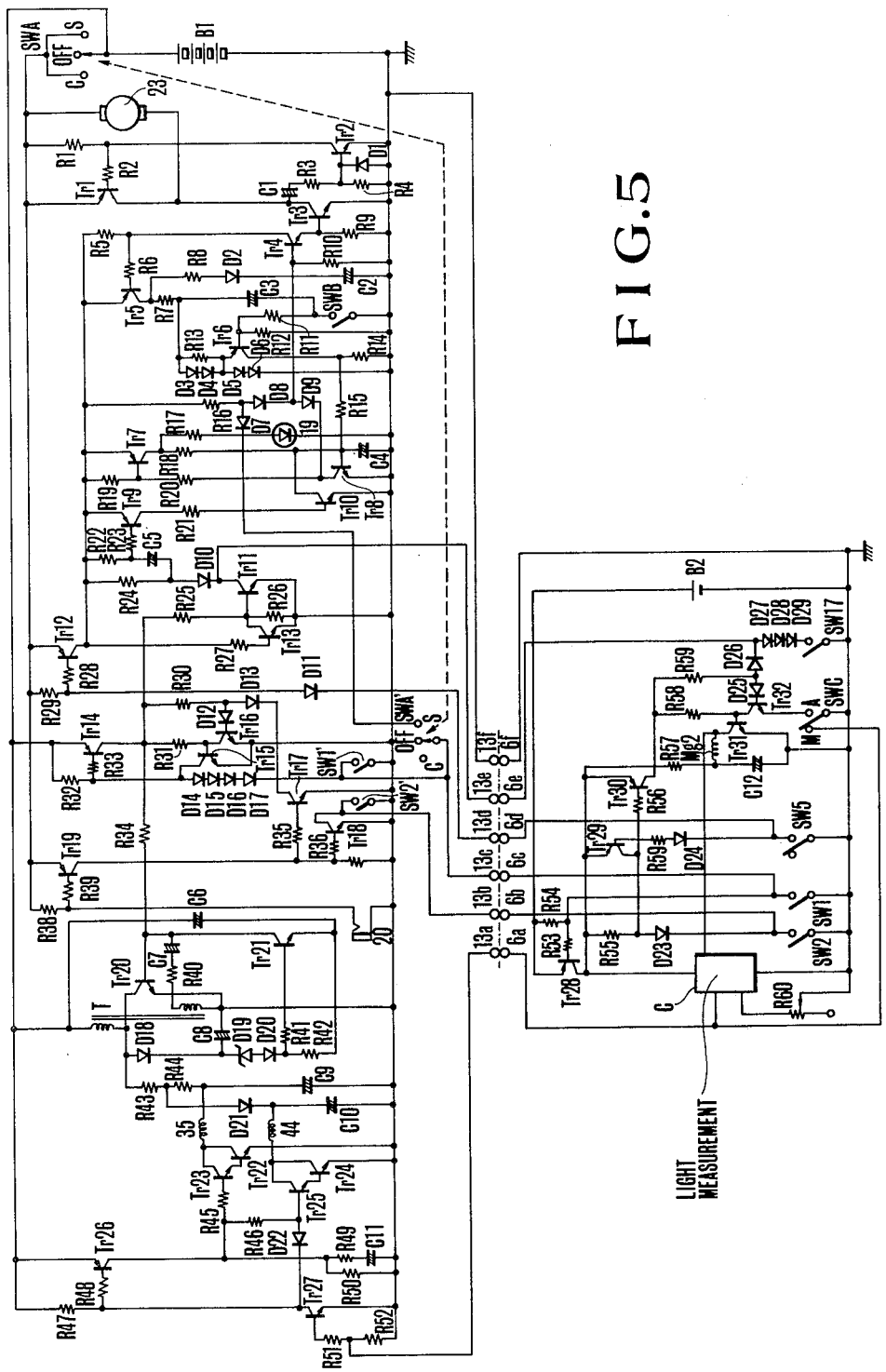
FIG. 5 is a circuit diagram of the control circuit of the electric motor driven camera shown in FIG. 1.

The electric motor drive camera, shown in FIG. 1, is provided with a control circuit which is arranged as shown in FIG. 5. Referring to FIG. 5, the battery B1 of the electric motor drive device described in the foregoing is disposed within the motor drive device. The control circuit includes a main switch SWA and a mode selection switch SWA' which are shiftable between a continuous photographic mode position C and a single shot mode position S and are respectively interlocked with the mode selector dial 21. A counter switch SWB closes in response to a winding action after completion of photography for a given frame. A light measuring switch SW1 and a shutter release switch SW2 are respectively connected in parallel to the switches SW1' and SW2', which are disposed within the electric motor drive device. A switch SW5 is disposed within the camera body and closes upon completion of shutter release and opens upon completion of winding. Also disposed within the camera body is an automatic-manual selection switch SWC of shutter preference AE. With this switch SWC set in the automatic position A, the camera is set in a shutter preference AE mode in which the diaphragm aperture is automatically controlled. When the switch SWC is in the manual position M, an AE signal, which will be described hereinafter, is inhibited. A film detection switch SW17 closes when the film pulls out of the rail surface. A battery B2 of the camera is disposed within the camera body 1. The motor 23 is provided with braking transistors Tr1 and Tr2 which have resistors R1, R2 and R3 connected thereto. A capacitor C1 is arranged in series with the resistor R3. A diode D1 protects the transistor Tr1. Transistors Tr3, Tr4 and Tr5 are provided for operating the motor 23 along with a noise preventing capacitor C2. Resistors R5, R6, R8 and R10 are connected to them. A transistor Tr6, diodes D3, D4, D5 and D6, resistors R7, R11, R12, R13, R14 and R15 and a capacitor C3 jointly form a timer circuit which causes winding to automatically stop when winding is not completed within a predetermined period of time. A latch circuit for stopping the winding operation is formed with transistors Tr7, Tr8 and resistors R17, R18, R19 and R20. A reference symbol C4 designates a capacitor for preventing noise. The latch circuit is released by transistors Tr9 and Tr10 which form a latch release circuit jointly with a capacitor C5 and resistors R21, R22, R23 and R24. A transistor Tr11 controls an AEOK signal which will be described hereinafter; a transistor Tr13 turns off the transistor Tr11 when the above-stated switch SW5 is turned on, turning on the transistor Tr12; and R25, R26 and R27 designate biasing resistors provided for the transistors Tr11, Tr12 and Tr13. When the above-stated switch SW1 is turned on, a DC-DC converter which will be described hereinafter is actuated by transistors Tr14, Tr15 and Tr16 which form a DC-DC converter operation circuit jointly with diodes D12, D13, D14, D15, D16 and D17 and resistors R30, R31, R32, R33 and R34.

The control circuit further includes a remote control jack 20; transistors Tr17, Tr18 and Tr19 which control a remote control circuit; biasing resistors R35, R36, R38 and R39; transistors Tr20 and Tr21 which form an oscillation circuit of the DC-DC converter; a transformer T; capacitors C6, C7 and C8 for the converter; a Zener diode D19 which restricts a boosted voltage; diodes D18 and D20; biasing resistors R40, R41 and R42; capacitors C9 and C10 which respectively drive the magnets 35 and 44 and are charged with the output of the DC-DC converter through a resistor R43; a transistor Tr22 which is provided for driving the magnet 35 and another transistor Tr24 which is for driving the other magnet 44. These transistors Tr22 and Tr24 are controlled respectively by transistors Tr33 and Tr25; diodes D21 and D22; a capacitor C11; biasing resistors R45, R46, R47, R48, R49, R50, R51 and R52; and transistors Tr26 and Tr27 which control the above-stated magnet driving circuit.

The camera is provided with a battery B2 and a magnet Mg2 for actuating the camera. A light measuring circiuit C is actuated by a transistor Tr28 which turns on when the above-stated switch SW1 is turned on. Symbols R53 and R54 designate biasing resistors; Tr29 designates a transistor which is controlled by the switch SW5; R57 designates a biasing resistor; D24 a diode; Tr30 a transistor which is controlled by the above-stated switch SW2 and the transistor Tr29; R55 and R56 biasing resistors; and D23 a diode.

A transistor 32 is controlled by the switch SWC and the transistor Tr11. A transistor Tr31 drives the magnet Mg2 and is controlled by the transistor Tr32. A capacitor C12 drives the magnet Mg2 and is charged through the resistor R57.

Reference symbols R58 and R59 designate biasing resistors and D25-D29 designate diodes.

When the switches Sw1 and SW1' are turned on to effect the power supply, the light measuring circuit C performs light measurement and a computing operation. With the above-stated switch SWC in the automatic position A, the circuit C produces aperture control pulses (hereinafter called an AE signal) based on the computed value of the terminal 6a mentioned in the foregoing when the transistor Tr31 is turned on. There is provided a variable resistor R60 which detects the aperture value and is disposed within the camera body to operate in association with the lens stop signal lever 78 mentioned in the foregoing.

The embodiment described in the foregoing operates in the following manner: Referring to FIG. 1, the switch SW1' is turned on when the release button 22 is depressed under a winding completed condition. Referring now to FIG. 5, with the switch SW1' turned on, the voltage of the battery B2 of the camera is impressed on the light measuring circuit C and then the transistors Tr14 and Tr15 are turned on. Then, a current flows through the transistor Tr14 and the resistor R34 to the base of the transistor Tr20 to turn on the transistor Tr20. The transistor Tr20 is rendered further conductive through the resistor R40 and the capacitor C7 to permit current flow to the above-stated transformer T. When the current increasing rate of the transformer T decreases, the current flowing through the resistor R40 and the capacitor C7 decreases accordingly to turn off the transistor Tr20. With the transistor Tr20 thus turned off, the current flowing through the transformer T decreases. This quick change of current results in a reverse voltage produced at the transistor T. In other words, the voltage on the anode side of the above-stated diode D18 is then boosted to become higher than the voltage of about 6 V of the power source B2. The power thus obtained is used to charge the above-stated capacitor C8 therewith through the diode D18. When the voltage of the capacitor C8 reaches a voltage of about 10 V controlled by the above-stated Zener diode D19, a current flows to the base of the transistor Tr21 through the Zener diode D19, the diode D20 and the resistor R41 turning on the transistor Tr21. The transistor Tr20 is then turned off ending the voltage boosting action. As a result of this, the voltage of the capacitor C8 becomes about 10 V.

The capacitor C9 is charged with a voltage boosted through the above-stated resistors R43 and R44 while the capacitor C10 is also charged with a voltage boosted through the resistor R43 and the above-stated diode D21. With the DC-DC converter in operation and these capacitors C9 and C10 being charged, the current flowing to the converter becomes very large and results in a terminal voltage of about 1 to 2 V of the battery B1. Therefore, even with the above-stated transistor Tr14 on, the base voltage of the transistor Tr11 is divided by the resistors R25 and R26 and thus becomes less than 0.6 V. Therefore, the transistor Tr11 is off. With the switch SWC in position A, even if the shutter release switch SW2' is turned on by a further depression of the release button 22, the transistor Tr30 is turned on and a current flows to the base of the transistor Tr32 through the transistors Tr28 and Tr30 turning on the transistor Tr32, thus short-circuiting between the base and emitter of the transistor Tr31. This causes the transistor Tr31 to remain off. The magnet Mg2 is thus not operated and the camera is not actuated.

Upon completion of charging of the capacitors C9 and C10, the boosting action by the converter comes to an end. Accordingly, the current flowing to the transformer T decreases. Therefore, the terminal voltage of the battery B1 becomes high. When the terminal voltage exceeds 2.4 V or thereabout, the base potential of the transistor Tr11 exceeds 0.6 V and turns on the transistor Tr11. The current of the battery B2 of the camera then flows to the transistor Tr11 through the transistor Tr28 and terminals 6e and 13e. This turns off the transistor Tr32. When the release switch SW2' is turned on, the transistor Tr30 turns on, and the transistor Tr31 turns on causing the electric charge of the capacitor C12 to flow to the magnet Mg2 which in turn actuates the camera.

When the transistor Tr31 turns on, the camera actuation signal is supplied to the light measuring circuit C. Then, a measured value of light is stored. Following this, the resulting computation of an aperture value based on the shutter speed, film sensitivity and measured light value is transmitted to the terminal 6a as AE signal pulses.

When the above-stated AE signal becomes high, a current flows through the terminals 6a and 13a and the resistor R51 to the base of the transistor Tr27 to turn on the transistor Tr27 and also the transistor Tr26. Then, the current which flows through the transistor Tr26 and the resistor R48 also flows through the diode D22 while the transistors Tr25 and Tr24 are off. However, since current flows to the base of the transistor Tr23 through the transistor Tr26 and the resistor R45, the transistor Tr23 is turned on causing the transistor Tr22 to turn on. With the transistor Tr22 turned on, the electric charge with which the capacitor C9 has been charged flows through the magnet 35 and the transistor Tr22 to operate the AE start magnet 35. Meanwhile, the capacitor C11 is charged through the transistor Tr26 and the resistor 49.

Referring to FIG. 2, when the AE start magnet 35 is operated, the armature 36b, which is one unified body with the start lever 36, is attracted by the magnet 35 turning the start lever 36 clockwise against the force of the spring 45. With the start lever 36 turning clockwise, the engaging parts 36a and 37a are disengaged to allow the sector gear 37 to be turned counterclockwise by the urging force of the spring 51. The turning force of the sector gear 37 is transmitted to the AE coupler 15 through the gear 38.

Referring now to FIG. 3, the rotation of the AE coupler is transmitted to the AE coupler 7 disposed on the camera side. The rotation is further transmitted through a transmission mechanism (not shown) but within the camera body to the aperture signal lever 78 causing clockwise rotation against the force of a spring which is not shown but is disposed within the lens.

Again, referring to FIG. 5, the resistance value of the variable resistor R60 changes in accordance with the aperture value in association with the rotation of the aperture signal lever 78. When the resistance value of the variable resistor R60 becomes a value corresponding to the computed aperture value obtained by the light measuring circuit C, the AE signal becomes low turning off the transistors Tr27. This in turn turns off the transistor Tr26. The electric charge with which the capacitor C11 has been charged then flows through the resistors R49 and R46 to the base of the transistor Tr25 to turn on the transistor Tr25. This turns on the transistor Tr24. With the transistor Tr24 turned on, the electric charge with which the capacitor C10 has been charged flows to the AE stopping magnet 44 to operate it.

Referring to FIG. 2, the rotational force of the sector gear 37 is transmitted not only to the AE camera 15 through the gear 38 but also to the stop wheel 41 through the gears 38, 39, 39a and 40. When the aperture value becomes a correct value, the AE stopping magnet 44 is operated as mentioned in the foregoing. With the magnet 44 operating, the armature which is one unified body with the stop lever 43 is attracted by the magnet 44 rotating the stop lever 43 counterclockwise against the force of the spring 47. With the stop lever 43 rotated counterclockwise, the clamping parts 43a and 42b are disengaged turning the stop pawl 42 clockwise by the biasing force of the spring 60. This brings the claw part 42a of the stop pawl 42 into the ratchet part 41a of the stop wheel 41 thereby stopping rotation of the stop wheel 41. With the rotation of the stop wheel 41 thus coming to a stop, the rotation of the AE coupler is brought to a stop through the gears 40, 39a, 39 and 38. This in turn stops the aperture signal lever 78 from attaining a correct aperture value. With the magnet Mg2 operating, the camera is actuated. A stopping down member (not shown) turns the aforementioned stopping down lever 79 counterclockwise thereby effecting stopping down. A mirror (not shown) is provided with a delay mechanism which moves upward and a shutter (not shown) is operated. The determination of the aperture value by the AE mechanism is completed before the upward movement of the mirror. The length of time required before completion of charging of the capacitors C9 and C10 after the switches SW1 and SW1' are turned on is about 100 ms. This length of time is about the same as the length of time required before the operation of the light measuring circuit C gives a stable measured value of light after the switches SW1 and SW1' are turned on. Furthermore, this length of time is almost equal to the length of time required before the second stroke is effected after the first stroke of a depressing operation when the aforementioned release button 22 is depressed with a finger, i.e., the length of time required before the switches SW2 and SW2' are turned on after the switches SW1 and SW1' are turned on.

Before the camera actuating magnet Mg2 is operated, the transistor Tr11 of the electric motor drive device is turned on, turning off the transistor Tr32; the switches SW2 and SW2' are turned on, turning on the transistor Tr30; and a current flows to the resistor R58 turning on the transistor Tr31, which in turn operates the magnet Mg2.

When the aforementioned switch SWC is set in the manual position M, the transistor Tr32 remains off. Therefore, with the switch SWC in the manual position M, when the switches SW2 and SW2' are turned on, the above-stated transistor Tr31 turns on operating the magnet Mg2. The aforementioned AE signal is always short-circuited to ground when the switch SWC is in the manual position M. Therefore, the AE signal is not produced under this condition. The switch SW5 closes upon completion of a shutter operation.

Again referring to FIG. 5, when the switch SW5 thus turns on, the transistor Tr29 causes the transistor Tr30 to turn off. Furthermore, with the switch SW5 on, the base current of the transistor Tr12 flows through the aforementioned signal terminals 6d and 13d, the diode D11 and the resistor R28, turning on the transistor Tr12. When the aforementioned mode selection switch SWA' is then in the position C, the base current of the transistor Tr4 flows through the resistor R16 and the diode D8 turning on the transistors Tr4 and Tr3. Then, a current flows from the battery B1 to the aforementioned motor 23 and the transistor Tr3. This causes the motor 23 to rotate.

Again referring to FIG. 2, with the motor thus rotating, a rotational force is transmitted through the gears 24, 25, 25a, 26, 26a and 27 to the cam 29 and the winding coupler 12. Then, in response to the movement of the cam 29, a connecting member (not shown) charges the aforementioned sector gear 37 in the clockwise direction (or in the direction of arrow a) against the force of the spring 51 to cause the clamping parts 37a and 36a to engage each other. Furthermore, the stop pawl 42 is also charged by a connecting member, which is not shown, in the counterclockwise direction (or in the direction of arrow b) against the force of the spring 60. This causes the claw part 42a and the ratchet part 41a to disengage from each other and causes the clamping parts 42b and 43a to engage each other.

Furthermore, a connecting member, which is not shown, causes the aforementioned counter driving lever 65 to turn back and forth in the direction of arrow c. The forward turning movement (clockwise movement) of the lever 65 then causes the ratchet wheel 68 to turn clockwise to an extent corresponding to one frame. Then, the stop pawl 69 overrides one tooth of the ratchet wheel and goes down to the next tooth against the force of the spring 70. In the backward (counterclockwise movement) of the lever 65, the feed pawl 64 overrides one tooth of the ratchet wheel 68 and goes down to the next one against the force of the spring 67. Referring now to FIG. 3, the rotation of the winding coupler 12 is transmitted to the winding coupler 4 disposed on the camera side. With the rotation transmitted, shutter charge, mirror charge and film winding actions are accomplished within the camera body through the camera charge cam 75, charge pin 77 and charge lever 76.

All the charging actions are completed with the winding coupler 12 rotated 180 degrees. Upon completion of these actions, the switch SW5 is turned off. Again referring to FIG. 5, since the base current of the transistor Tr12 does not flow then, the transistor Tr12 turns off and the transistors Tr4 and Tr3 also turn off. With the transistor Tr3 thus turned off, a current flows to the base of the transistor Tr2 through the capacitor C1 and the resistor R3 to turn on the transistor Tr2. This causes the transistor Tr1 to turn on to quickly bring the motor 23 to a stop by short-circuiting two terminals of the motor 23. With the release button 22 kept depressed, the next release is accomplished in the manner described in the foregoing at the same time as the switch SW5 is turned off. With the aforementioned mode selection switch SWA' in the position S, the operation of the shutter is completed and the switch SW5 turns on. Then, even if the transistor Tr12 turns on causing a current flow to the resistor R16, the current flows to the switches SW1 and SW1' through the diode D7 if the switches SW1 and SW1' are on. Then, since the current does not flow to the diode D8 and transistors Tr4 and Tr3, the motor remains stationary. When the switches SW1 and SW1' turn off, the current flows through the resistor R16, diode D8 and transistors Tr4 and Tr3 to the motor 23 rotating the motor 23. In other words, a winding action is performed when the depressing finger is detached from the release button 22, after completion of the release.

In cases where the voltage of the battery B1 drops, resulting in a prolonged winding time, the transistors Tr5 turns on concurrently with the transistors Tr4 and Tr3. The voltage at the anode side of the diode D3 is made almost constant by the diodes D3, D4, D5 and D6. If winding remains uncompleted after the lapse of time determined by the capacitor C3 and the resistors R11 and R12, the base potential of the transistor Tr6 becomes lower than the anode potential of the diode D3 turning on the transistor Tr6. With the transistor Tr6 turned on, a base current of the transistor Tr8 flows through the transistors Tr12 and Tr5, the resistor R7, the diodes D3 and D4, the transistor Tr6 and the resistor R15 turning on the transistor Tr8. This in turn causes the transistor Tr7 to turn on. With the transistor turned on, the light emitting diode 19 is caused to light up through the transistors Tr12 and Tr7 and the resistor R17. Concurrently, the current of the resistor R16 and that of the resistor R8 flow through the diode D9 and the transistor Tr8. This causes the transistor Tr4 to turn off. The transistor Tr3 also turns off to allow the aforementioned brake circuit to operate bringing the motor 23 to a stop.

Again referring to FIG. 2, upon completion of photography for a given frame, the aforementioned switch SWB, which is composed of the conductive pattern 73 and the contact piece 74, turns on in response to the stepwise advance of the aforementioned counter 16.

Referring now to FIG. 5, when the switch SWB turns on, the capacitor C3 is charged through the transistor Tr5 and the resistor R7. Since the resistance value of the resistor R7 is sufficiently smaller than that of the resistor R12, the length of time required for this charging process on the capacitor C3 is very short and the charging process is completed in 0.1 sec or thereabouts. Upon completion of charging of the capacitor C3, the potential of the transistor Tr6 becomes lower than the potential of the anode side of the diode D3. This causes the transistor Tr6 to turn on and thus causes the light emitting diode 19 to light up. At the same time, the abovestated brake circuit works to bring the motor 23 to a stop.

Film rewinding is accomplished in the following manner: Referring to FIG. 1, when the rewinding button 15 is operated, the sprocket release interlocking shaft 14 pushes the sprocket release button 8 upward to release the sprocket. Referring now to FIG. 2, in response to the operation on the rewinding button 15, the interlocking member which is not shown detaches the stop pawl 68 and the feed pawl 64 from the ratchet against the forces of the springs 70 and 67. A spring which is not shown causes the counter 16 to rotate counterclockwise and then stop at the start position S thereof while the switch SWB turns off.

Again referring to FIG. 2, even with the switch SWB thus turned off, the light emitting diode 19 still remains alight because of the latch circuit formed by the transistors Tr8 and Tr7, and the motor 23 remains stationary. Since the sprocket is in a released state, a rewinding crank which is not shown is operated to rewind the film.

Referring to FIG. 4, when the leader portion of the film pulls off the film sensing pin 87, the contact piece 85 is rendered conductive turning on the switch SW17.

Referring now to FIG. 5, with the switch SW17 thus turned on, the base current of the transistor Tr9 flows through the diodes D29, D28 and D27, the signal terminals 6e and 13e, the diode D10, the capacitor C5 and the resistor R23, turning on the transistor Tr9. Then the transistor Tr10 also turns on. With the transistor Tr10 thus turned on, a short-circuit takes place between the base and emitter of the transistor Tr8 turning off the transistor Tr8. With the transistor Tr8 turned off, the base current of the transistor Tr7 no longer flows. Therefore, the transistor Tr7 turns off and the light emitting diode 19 is put out accordingly. Furthermore, with the transistor Tr8 turned off, the current flowing through the resistor R16 again flows to the base of the transistor Tr4 through the diode D8 turning on the transistor Tr4. This in turn causes the transistor Tr3 to turn on thereby allowing a current flow to the motor 23 rotating the motor. With the motor thus caused to rotate, the camera and electric motor drive device, which have been stopped halfway in a winding process, are wound up completely. When the switch SW5 turns off after completion of the winding process, the transistor Tr12 turns off as mentioned in the foregoing. The transistors Tr4 and Tr3 then turn off operating the brake circuit to bring the motor 23 to a stop.

Using the remote control jack 20, when a remote control device is turned on by inserting a remote control plug into the remote control jack, the transistor Tr19 turns on causing the base current of the transistor Tr17 to flow through the resistor R35 turning on the transistor Tr17. This turns on the transistor Tr28 through the resistor R53, the signal terminals 6c and 13c and the transistor Tr17. With the transistor Tr28 turned on, the power supply to the light measuring circuit C is effected. Furthermore, the transistor Tr18 turns on with the base current of the transistor flowing through the resistor R36. With the transistor Tr18 turned on, the base current of the transistor Tr30 flows through the resistor R56, the diode D23, the signal terminals 6b and 13b and the transistor Tr18 to turn on the transistor Tr30. This in turn operates the transistor Tr31 and eventually causes the magnet Mg2 to operate in the same manner as described in the foregoing. Then, with the switch SWC in the automatic position A, an AE signal is produced at the signal terminal 6a and a series of ensuing actions take place.

As described in the foregoing, when the motor comes to a stop after the film has come to its end, the light emitting diode lights up; the film is then rewound; and the light emitting diode is extinguished upon completion of film rewinding by the film detection switch. With rewinding completed, the camera is then automatically set in a winding completed position. Therefore, the apparatus in accordance with the invention obviates the necessity for any particular operation that has heretofore been necessitated by the adoption of an electric motor drive device. The arrangement placing the camera always in the winding completed state greatly facilitates the next photographic operation. The camera body and the electric motor drive device are always kept in an in-phase relation to each other. This permits mounting and dismounting operations without exerting any particular care. The camera being set in the winding completed position upon completion of rewinding precludes the fear of film exposure by accidental release during the rewinding process. Furthermore, in accordance with the invention, the film detection signal terminal provided between the camera body and the electric motor drive device is usable also for other signals. This not only permits reduction in the size of the device but also brings about improved electrical reliability resulting from a reduction in the number of electrical contacts.

What is claimed is:

1. An electric motor driven camera comprising:
   driving means for winding film inserted in the camera;
   control means arranged to stop said driving means upon completion of winding and to allow the driving means to perform a driving action upon completion of an exposure action;
   stopping means arranged to bring the driving action to a stop after completion of photographing of all film frames;
   detection means for detecting completion of film rewinding, said detection means being arranged to generate a detection signal when completion of film rewinding is detected; and
   release means which releases said stopping means from the stopping action thereof in response to the detection signal from said detection means, said release means being arranged to operate the driving means until completion of winding by releasing the stopping means from the stopping action thereof.

2. An electric motor driven camera according to claim 1, wherein said detection means is provided with a detection switch and is arranged to generate said detection signal in response to the switching action of the detection switch.

3. An electric motor driven camera according to claim 1, wherein said stopping means is provided with a latch circuit which is arranged to keep said driving means in a driving action suspended state; and said release means is arranged to release said latch circuit from the latching state thereof.

4. An electric motor driven camera according to claim 1, further including a display means which displays the end of the film in response to the detection signal generated by said detection means.

5. An electric motor driven camera comprising:
a motor for winding film inserted in the camera;
a first control circuit arranged to bring said motor to a stop upon completion of winding and to allow the motor to operate upon completion of an exposure effecting action;
a detection circuit which detects completion of film rewinding, said circuit being arranged to generate a detection signal by detecting completion of film rewinding; and
a second control circuit arranged to bring said motor to a stop after completion of photographing of all film frames, said second control circuit being arranged to release the motor from a driving action suspended state when said detection signal is applied thereto and to allow the motor to perform a driving action for winding until completion of winding.

6. An electric motor driven camera comprising:
driving means for winding film inserted in the camera;
control means arranged to bring the driving action of said driving means to a stop upon completion of winding and to allow the driving means to perform the driving action upon completion of an exposure effecting action;
stopping means for bringing the driving action of said driving means to a stop after completion of photographing of all film frames under a winding incompleted state;
detection means for detecting completion of film rewinding, said detection means being arranged to generate a detection signal upon completion of a rewinding action on the film;
release means which releases said stopping means from the stopping action thereof in response to the detection signal from said detection means, said release means being arranged to permit said driving means to perform a driving action until completion of winding by releasing the stopping means from the stopping action;
transmission means for transmitting the detection signal from said detection means to said release means;
signal generating means for generating a release preparation signal; and
camera release means for performing a release action of the camera, said means being arranged to be rendered operative by said release preparation signal when said release preparation signal is applied thereto through said transmission means.

7. An electric motor driven camera according to claim 6, wherein said motor driven camera consists of a camera body and an electric motor drive device which is attachable to and detachable from said camera body; and wherein said release means is disposed within the camera body and is arranged to permit supply of the detection signal and the release preparation signal from the electric motor drive device thereto through said transmission means.

8. An electric motor driven camera according to claim 7, wherein said transmission means includes a terminal which electrically connects the camera body to the electric motor drive device, said terminal being usable in common for transmission of both the detection signal and the release preparation signal.

* * * * *